(12) United States Patent
Takidis et al.

(10) Patent No.: US 7,681,496 B2
(45) Date of Patent: Mar. 23, 2010

(54) METHOD AND DEVICE FOR STRAPPING GOODS

(75) Inventors: Dimitrios Takidis, Dubendorf (CH); Flavio Finzo, Wurenlos (CH); Harry Aderhold, Oberlunkhofen (CH)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/159,245

(22) PCT Filed: Dec. 22, 2006

(86) PCT No.: PCT/IB2006/003759

§ 371 (c)(1),
(2), (4) Date: Jun. 26, 2008

(87) PCT Pub. No.: WO2007/074372

PCT Pub. Date: Jul. 5, 2007

(65) Prior Publication Data

US 2008/0289516 A1 Nov. 27, 2008

(30) Foreign Application Priority Data

Dec. 28, 2005 (CH) .................................. 2082/05

(51) Int. Cl.
*B65B 13/32* (2006.01)
(52) U.S. Cl. .................................................. 100/33 R
(58) Field of Classification Search .................. 100/26, 100/29, 32, 33 R; 219/56, 57, 91.21
See application file for complete search history.

(56) References Cited

U.S. PATENT DOCUMENTS

| 2,614,487 | A | * | 10/1952 | Cheesman | 100/27 |
| 3,057,289 | A | * | 10/1962 | Luthi | 100/26 |
| 3,439,606 | A | * | 4/1969 | Bursik et al. | 100/26 |
| 3,674,972 | A | * | 7/1972 | Stahnke | 219/56 |
| 4,037,073 | A | | 7/1977 | Becker | |
| 4,072,843 | A | | 2/1978 | Szabo | |
| 5,140,126 | A | * | 8/1992 | Ishibashi | 219/110 |

FOREIGN PATENT DOCUMENTS

| DE | 929059 | 6/1955 |
| EP | 0621181 | 10/1994 |
| EP | 0816004 | 1/1998 |
| GB | 489050 | 7/1938 |

OTHER PUBLICATIONS

International Search Report (dated Jun. 15, 2007) for PCT/IB2006/003759 (Int'l Filing Date: Dec. 22, 2006).

* cited by examiner

*Primary Examiner*—Jimmy T Nguyen
(74) *Attorney, Agent, or Firm*—Levenfeld Pearlstein, LLC

(57) ABSTRACT

In a method to seal/lock a strap (44) including a metal strap (44d) which is fitted at least in the zone of seal with a protective layer (44c), the packing strap is laid in the form of a loop around the package and is held, in particular, clamped, in place before and/or during production of the seal. The seal is implemented on the packing strap (44) by resistance welding and the protective layer (44c) of the packing strap (44) shall be pierced before and/or during production of the seal.

7 Claims, 9 Drawing Sheets

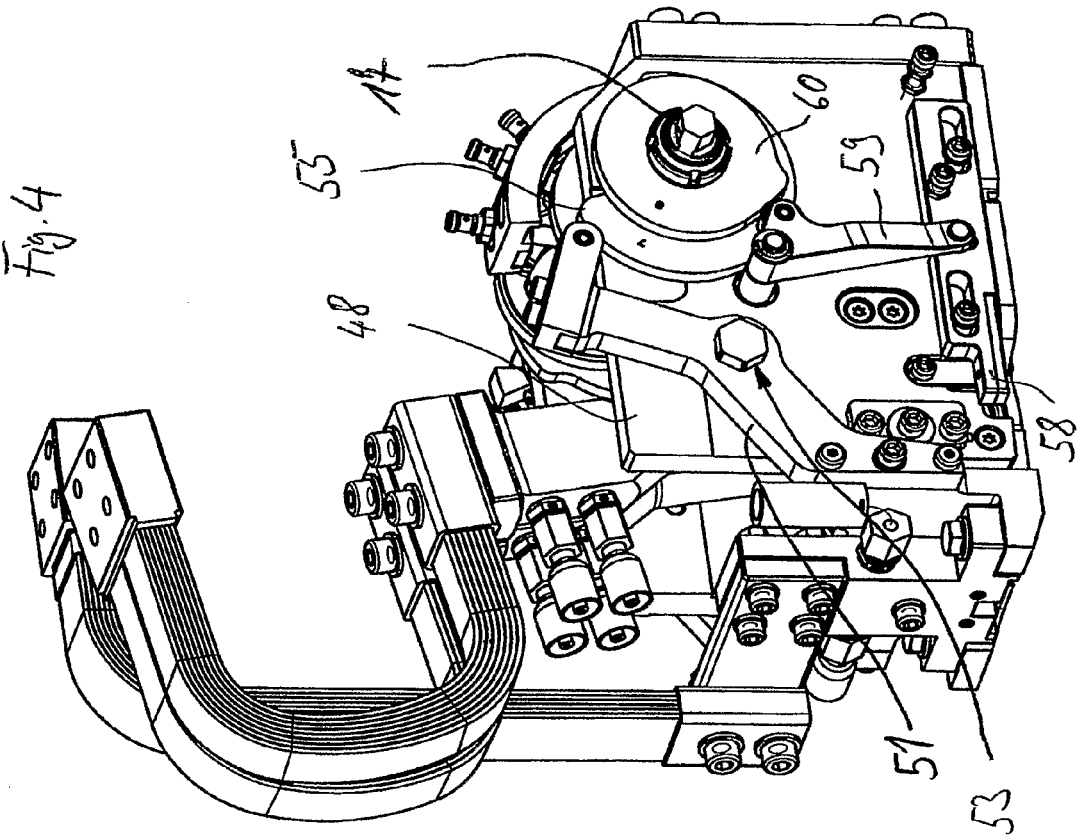
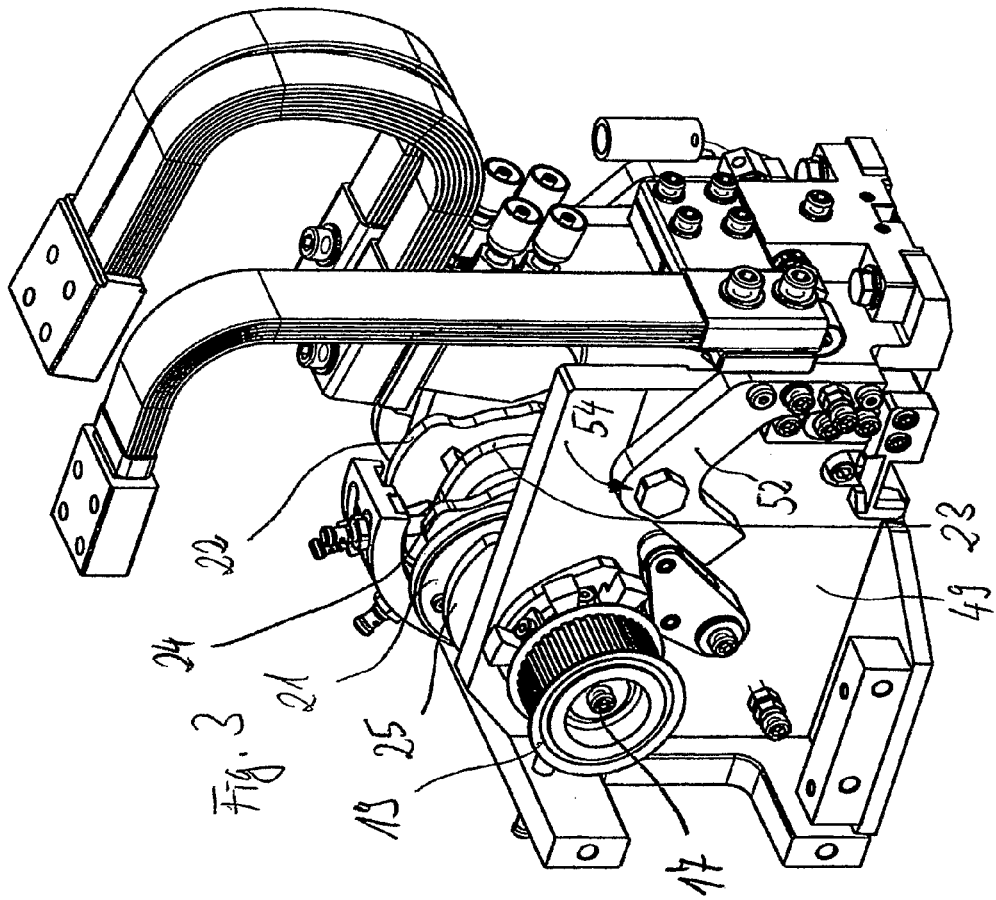

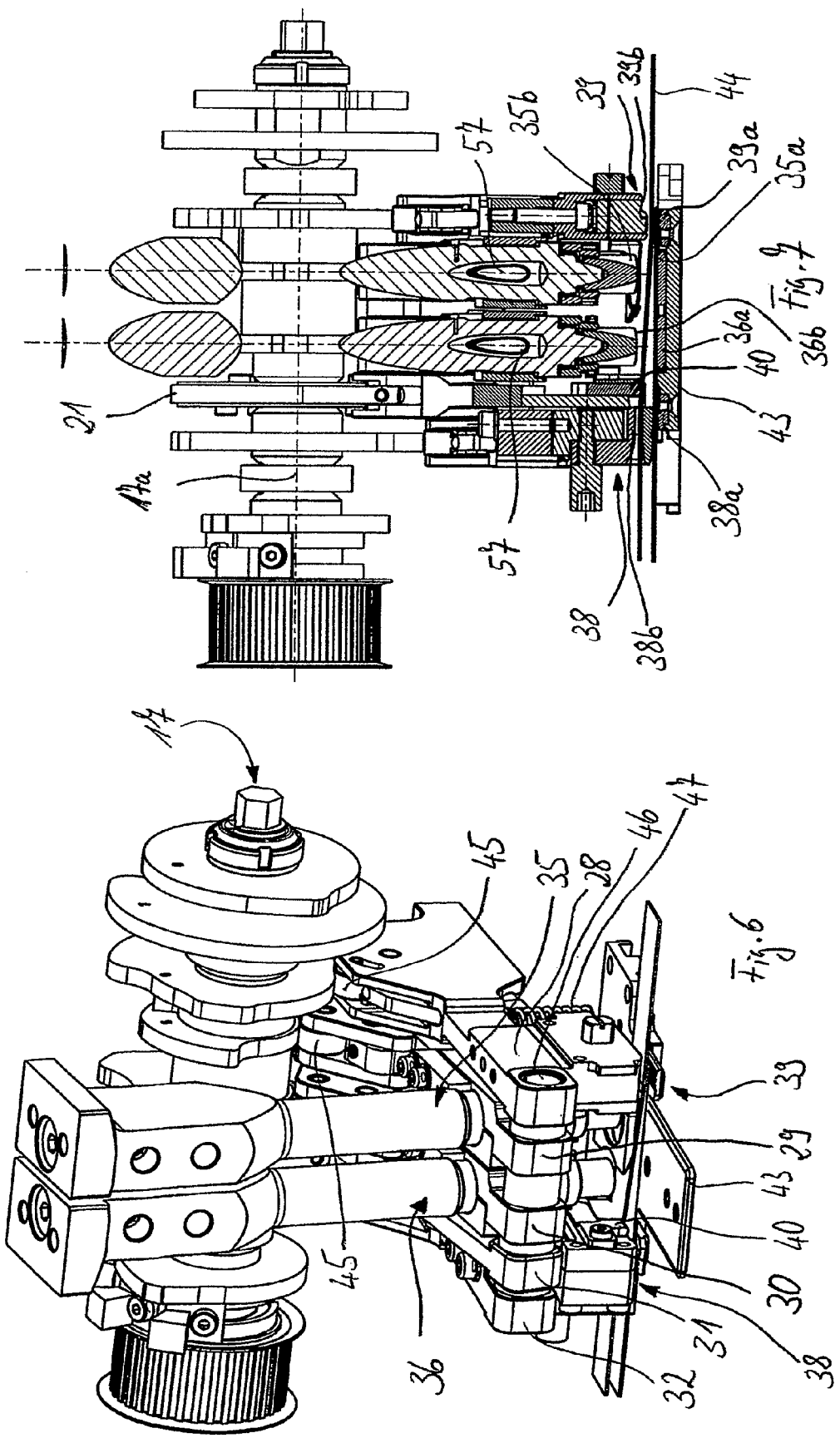

METHOD AND DEVICE FOR STRAPPING GOODS

CROSS-REFERENCE TO RELATED APPLICATION

This application claims the benefit of priority of International Application No. PCT/IB2006/003759, filed Dec. 22, 2006, entitled "METHOD AND DEVICE FOR STRAPPING GOODS".

TECHNICAL FIELD

The disclosure relates to a method creating a seal for a packing (looping) strap fitted with a metal strap, in particular a metal steel strap, said strap being fitted with a protective coat at least in the zone of said seal, the packing strap being placed in the form of a strap loop around the package and being kept in place in a predetermined manner prior to and/or during the creation of said seal, for instance being clamped in place by at least one strap clamp. The disclosure also relates to strapping equipment to strap a package and comprising a metal packing strap fitted with a protective coating, said equipment being fitted with a sealing device to create a seal allowing joining together two superposed strap plies of a packing strap loop.

BACKGROUND

To appropriately ship packages, it has long been known to strap such packages with one or several packing straps that are sealed by strapping equipment to said packages. To ship heavy-industry goods, usually, though not exclusively, the above cited metal straps and in particular steel straps are used. To prevent such steel straps from rusting, they are ever more frequently fitted with a protective coat that typically may be an enamel or the like or a wax.

The strapping equipment of the art is fitted with a strap guide and a drive to guide said strap around the package. As a rule, the strapping equipment also comprises a tensioner to allow appropriately tensioning the strap loop placed around the particular package. A clamping system of said strapping equipment allows sealing said strap loop to the material to be packed to be used in the ensuing connection procedure at the package. Thereupon, the strap loop shall be locked/sealed in place in a zone of said loop where two strap plies are superposed on each other.

In a first known procedure of the art, said seal is implemented on packing straps of the above kind by using an additional sealing element placed around the said overlapping strap ends and then being plastically deformed. This procedure however incurs the drawback of requiring an additional sealing element, typically a lead seal. Moreover, this kind of seal may not always withstand high stresses. The same reservations apply to other strapping techniques that do not use sealing elements, for instance resorting to notched sealing elements.

Also the European patent document EP 0 621 181 B1 discloses a procedure using a tungsten inert gas procedure to permanently join together the two strap ends without resort to another sealing element. This procedure, however, may be considered disadvantageous in that an inert gas must be used to for seal. No other need for inert gas existing in many enterprises that use such strapping equipment, the latter alone must justify inert gas logistics and supplies for strapping.

Besides the above cited tungsten inert gas welding procedure, other appropriate procedures to create an seal on protectively coated straps are known and appropriate, namely those joining the two strap plies by resort to notches. However the ensuing restricted load capacity of such connections and the relatively large area of damage to the said protective layer and to the metal strap may be considered disadvantageous.

Lastly, the German patent document 929 059 discloses connecting to each other two strap ends by resistance welding. In this procedure, resistance welding is used wherein two electrodes will directly contact the metal surfaces of the two strap plies which in turn also make electrical contact with each other. Electric contact between the two electrodes by means of the two strap plies is easily established. Said German patent document 929 059 is dated from the year 1959. At that time only uncoated steel straps were used, consequently the objective of the German patent document 929 059 has been inappropriate to packing straps fitted with a protective coating.

Indeed the most diverse procedures relating to other applications, for instance pressure welding techniques such as gas pressure welding or ultrasonic welding also are known. However the coatings of the packing straps also always are an impediment in such welding procedures, they ought to be considered basically inappropriate.

SUMMARY

Accordingly, there is a need to create a method and equipment for a strap seal where the straps are fitted with an external protective coating, in particular an enamel or the like or a wax coating. In particular, disclosed embodiments of the present invention create especially high load resistance with minimal damage to the protective coating.

A method for creating a seal uses resistance welding at the packing strap, said method in accordance with disclosed embodiments of the present invention, in particular, including mechanically piercing the strap protective coating in the area of said seal before or during its implementation. Accordingly, the disclosed embodiments of the present invention are also based on the insight that, contrary to prevailing expert opinion, it is quite feasible to seal to each other straps fitted with typically electrically non-conducting protective coatings using resistance welding. The resistance welding procedures of the disclosed embodiments of the present invention allow making seals of high load strength.

Because the electrically non-conducting protective layers preclude generating currents adequate for welding, especially between the strap plies, the protective layer of the disclosed embodiments of the present invention may be expelled locally from a minute area in order to set up electrical contact between an electrically conducting component of the strapping equipment and the metal strap. It was found that with this localized damage to the protective layer, no serious degradation of the packing strip need be feared, for instance from rusting.

The electric contact between the welding apparatus and the metal strap required for resistance welding may be attained in a number of ways. A first embodiment of the present method pierces the protective layer within the zone of the anticipated welding site. In particular this may be done by generating a bulge in at least one of the strap plies as required for projection resistance welding. In the process, at the plastically deformed welding site of the metal strip, the protective layer tears open. Thereupon, the damaged site may be used both to generate the first electrically conducting contact between the seal and the strap plies and as the site of connection/seal.

In another embodiment, said two sites of piercing of the protective layer may be a distance apart. Preferably the minimum of one site where predetermined piercing of, i.e. damage to the protective layer is made, shall be situated very near to at least one of the welding sites. Preferably such piercing shall be implemented at both strap plies, in particular at two plies which are externally accessible and, with regard to the direction of the packing strap, at least substantially at the same site of the two plies.

In particular, with regard to spot welding, first an electrical shunt or bypass circuit or current detour shall be generated. This terminology denotes that initially an electrical current is generated through the strap along a path that at least partly deviates from the path of that current which shall implement the weld joint. Preferably, the current detour passes through an electrode member into a first strap ply to the first element with which piercing of the protective layer is implemented in the same strap ply. Accordingly, both the first electrode member and the first element to be discussed below make contact with this strap ply. In an embodiment, said first element may be electrically conducting per se and can make electrical contact with the second element by means of the strapping equipment, the second element also being used to damage or pierce the protective coat at the second strap site. Consequently, the second element shall preferably make contact with the metal strap and the current is able to pass through the second strap site from the second element to a second electrode in turn connected to a power source. In this embodiment of a detour circuit, both the first and preferably also the second element shall be electrically conducting.

A strap clamp, which typically is used to seal the strap prior to and/or during production of the seal, does touch the strap and therefore, the clamp elements of the strap clamp may be used in an appropriate embodiment of the present invention to pierce the protective layer. In this process the contact surface of the protective layer as well as the pressure at which the clamp elements are forced against the strap plies may be respectively so shaped and selected that the protective layer shall be pierced by the strap clamp. Where conventional seals were used heretofore, damaging the protective layer was considered a drawback and was carefully avoided.

The spot-welding procedure of disclosed embodiments of the present invention may be used at little technical and logistic complexity while nevertheless offering high operational reliability. This technical problem is solved by strapping equipment which is characterized in that the sealing system is a resistance welder which comprises at least two electrodes that may be hooked up to a power source and at least one piercing element allowing piercing the protective layer of at least one of the strap plies in order to thereby allow electrical contact between the metal band and the piercing element.

In another aspect of the present invention, having independent significance, the strapping equipment includes a module usually termed "strapping head". All those mechanical components, or a part of them, which are required to advance the strap, to generate the strap tension, to seal the strap during production of the seal, to cut off the strap and to implement the seal, may be combined compactly in this strapping head. In accordance with disclosed embodiments of the present invention, an electric power element of the resistance welder preferably shall be configured as a whole immediately next to electrode members of the resistance welder. This configuration offers the advantage in particular that one or more welding cables between said power element and the minimum of one electrode member may be kept short and the cross-section of the welding cable(s) need not be excessively large. Moreover, electric losses are reduced thereby and cooling shall be minimized.

BRIEF DESCRIPTION OF THE DRAWINGS

The benefits and advantages of the present invention will become more readily apparent to those of ordinary skill in the relevant art after reviewing the following detailed description and accompanying drawings, wherein:

FIG. 3 is a first elevation of a partial view of the strapping head of FIG. 2, FIG. 4 is a second elevation of a partial view of the strapping head of FIGS. 2 and 3, FIG. 6 is a further perspective partial view of the strapping head, FIG. 7 is a longitudinal section of the apparatus shown in FIG. 6, FIGS. 8-13 a schematized strapping method in accordance with a further embodiment of the invention.

DETAILED DESCRIPTION OF THE INVENTION

Figure 1:
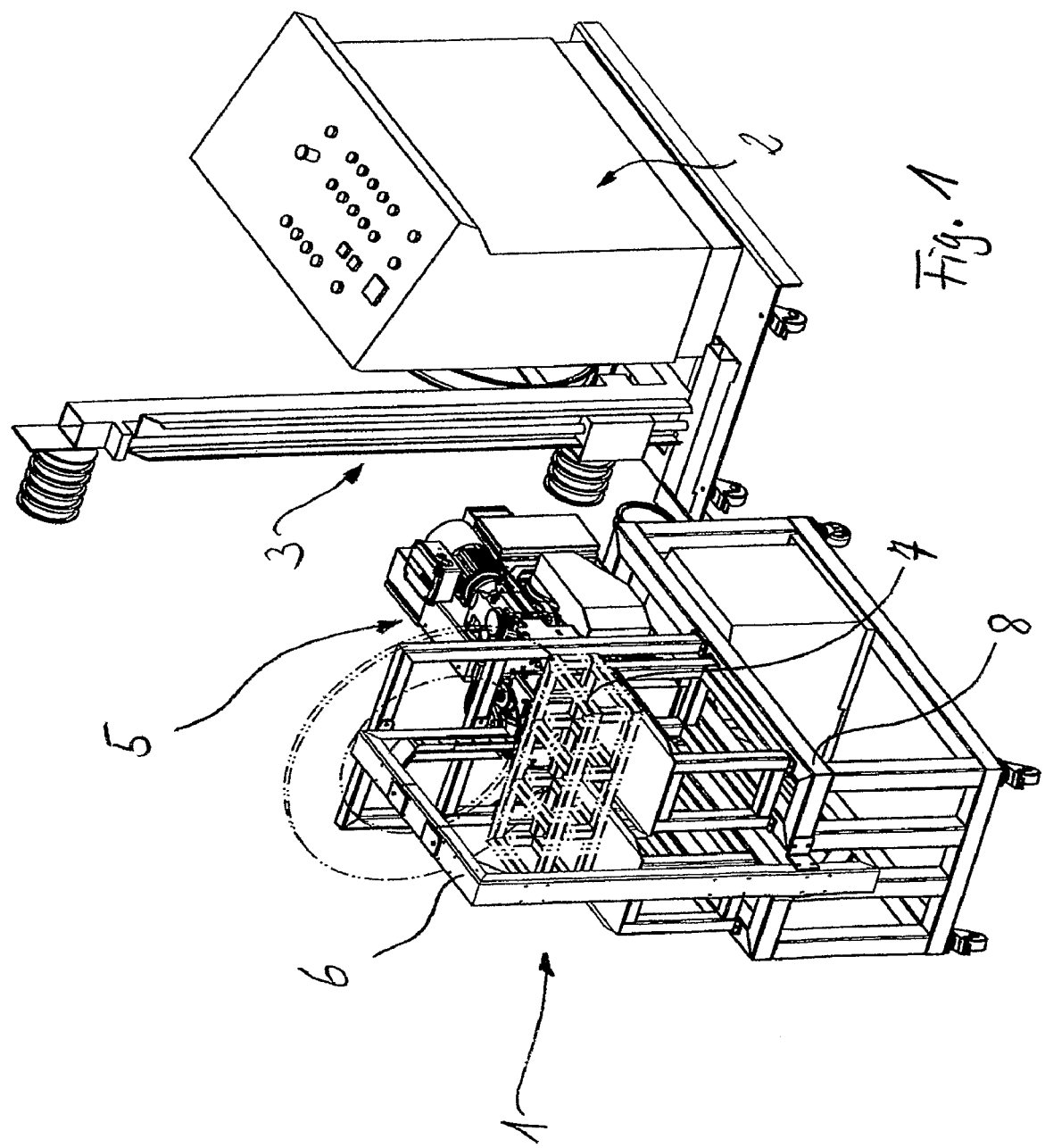
FIG. 1 is a perspective of strapping equipment in accordance with an embodiment of the invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention", relates to a requirement of the United States Patent Office, and does not imply, nor should be inferred to limit the subject matter disclosed herein.

FIG. 1 shows strapping equipment 1 comprising a control console 2, a supply receptacle 3 to store and to dispense the packing strap, a strapping head 5 to advance said strap, to tension a strap loop and further to implement a packing strap seal. Moreover the strapping equipment is fitted with a strap guide 6 whereby the strap is automatically moved by the machine along a predetermined path on and around a package 7. All components except the strapping head 5 are conventional in strapping equipment.

Figure 2:
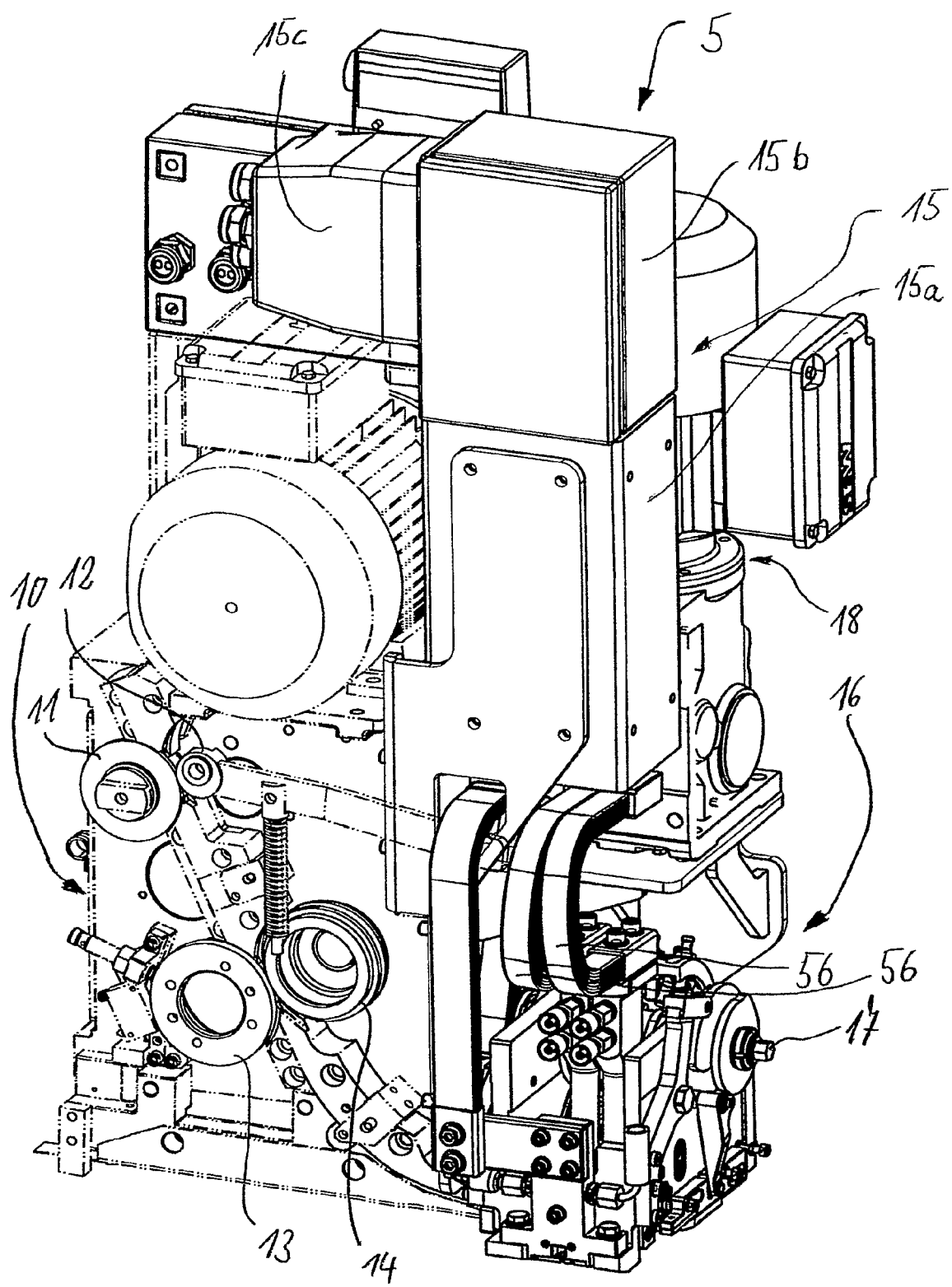
FIG. 2 shows a strapping head of the strapping equipment of FIG. 1.

The strapping head 5 is mounted jointly with the guide 6 on a framework 8 and shown separately in FIG. 2, and also comprises a strap drive 10 known per se. Said drive may be fitted with in particular with one or several pairs of rollers 11, 12; 13, 14 and optionally with further individual deflection rollers of which at least one is motor driven to advance or pull back the strap, which is guided between said rollers.

A welding and clamping unit 16 is integrated into the strapping head 5 which further comprises a welding power source 15. To control the operations of said unit 16 and to synchronize them, use is made of a control shaft 17 shown in FIGS. 3 and 4 which is actuated in a manner not elucidated further by a drive 18. For that purpose the welding and clamping unit 16 is fitted at one of its end faces with a belt wheel 19 operationally connected in a manner not elucidated further here by a toothed belt to the drive 18. An electric motor, of the drive 18, for instance a stepping motor, powers the control shaft 17 by means of omitted toothed belts. Said motor in turn is controlled by the strapping head control 2.

Figure 5:
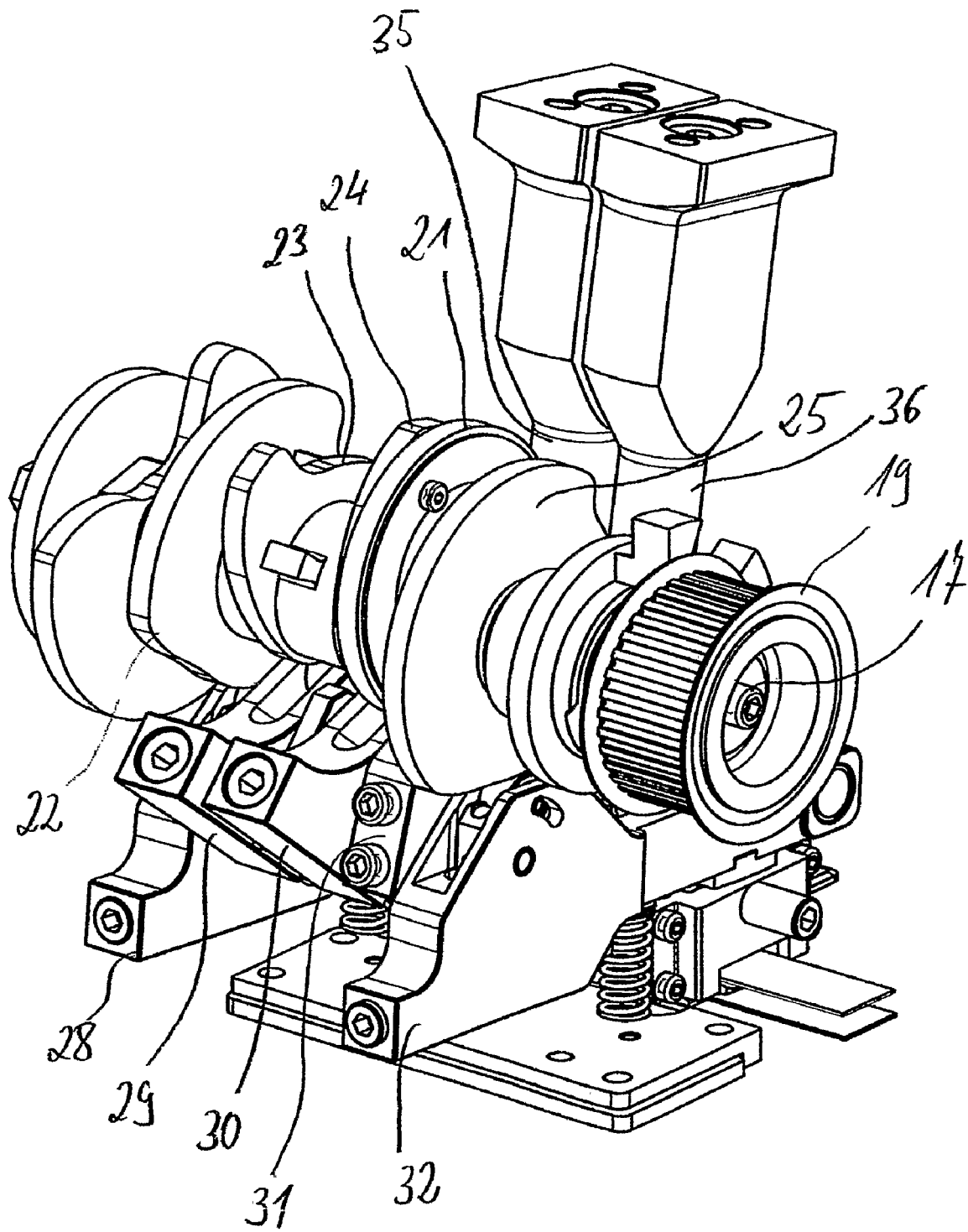
FIG. 5 shows a control shaft of the strapping head with part of the drive lever actuated by the control shaft.

As shown in particular in FIGS. 5, 6, and 7, various control cams 22,23,24,25 and by an eccentric cam 21 are fixed irrotationally relative to and on the control shaft 17 and are each associated with one of the control levers 28, 29, 30, 31. Each of the levers 28-32 is operationally connected to a first and a second spot welding electrode 35, 36 and also to each of two strap clamps 38, 39. The lever 31 drives a cutting blade 40 to cut off the packing strap 44. The control levers may carry out the drive motions for the component linked to them. Moreover, a further control cam generates an inward or outward pivoting motion of a pivoting plate 43 of the welding and clamping unit.

To reduce wear, the levers 28-32 each may be fitted with a roller 45 implementing the contact with the particular control cam 22-25 or the eccentric cam 21. Alternatively too, one or several of the levers 28-32 shall not be fitted with such roller(s) but are in direct contact with the associated control cam 21-25. Each lever 28-32 is configured on a pivot shaft 46 running parallel to the axis 17a of the control shaft 17, the levers 28-32 carrying out pivoting motions about said axis due to the particular associated control cam or eccentric cam. Each lever 28-32 is fitted with its own compression spring 47 forcing it against its associated control cam or eccentric cam. Said springs assure reliable contact between the control cams and the levers.

The pivot plate 43 is pivotally connected (FIGS. 3 and 4) to two static support plates 48, 49 which are configured apart from and parallel to each other. Two coupling levers 51, 52 of the pivot plate 43 are connected for that purpose by pivot pins 53, 54 to the support plates 48, 49. One of the coupling levers 51 makes contact by one contact end with a further control cam 55 of the control shaft 17. This control shaft 55 predetermines the timing of the inward and outward pivoting motions as well as the dwell time of the pivot plate 43 in the particular position. Lower clamp elements 38a, 39a of the two strap clamps 38, 39, and a lower electrode member 35a, 36a or one common lower electrode member of the two or more electrodes 35, 36, are configured on said pivot plate 43. The configuration of the upper electrode members 35b, 36b which jointly with the lower electrode members 35a, 36a constitute the electrodes 35, 36 are elucidated further below.

The components implementing the operations of the welding and clamping unit 16 are mounted to the control levers 28-32. As shown more clearly in FIGS. 5 through 7, upper clamp elements 38b, 39b of a first and second strap clamp 38, 39 are mounted on the lower sides of two external levers 28, 32 respectively. The two upper clamp elements 38b, 39b each cooperate respectively with the lower clamp element 38a, 39a mounted on the pivot plate 43 of the first and second strap clamps. The upper clamp element 39b of the second strap clamp 39 is connected in electrically conducting manner by means of the lever 28, further by the pivot shaft 46 resting on the support plate 48 and by the pivot plate 43, with the lower clamp element 39a of the same strap clamp 39.

The upper clamp elements 38b, 39b are moved toward the particular associated lower clamp elements 38a, 39a at given times and, following a given dwell time, shall then be moved back. The clamp elements 39a, 39b in particular are fitted with metallic, sharp-edged notching elements such as teeth or sharp tips of sufficient size to pierce the protective layer of the packing strap 44.

The first and second electrodes 35, 36 each comprising the upper and the lower electrode member 35a, 35b; 36a, 36b are configured between the two strap clamps 38, 39 (FIG. 7). The two upper electrode members 35b, 36b are guided up-and-down relative to the pivot plate by a lever 29, 30. Both upper electrode members 35b, 36b comprise a cavity 57 which is part of a water cooling system for them. Each upper electrode member 35b, 36b is connected electrically by one of the two welding cables 56 to a transformer 15a (FIG. 2). Said transformer in turn is connected to a thyristor system 15b which by means of a plug connection box 15c can be connected to an electric power source. The transformer 15a, the thyristor system 15b and the connection box are all part of the resistance welder electric power supply.

Lastly the cutoff blade is situated between the upper electrode member 36b of the second electrode 36 and the upper clamp element of the first strap clamp 38.

A strap stop 58 is linked to a rocker 59 which in turn is displaceable to-and-fro by means of a further control cam 60 of the control shaft 17. The strap stop may be moved in this manner into the path of the packing strap when the strap loop is being deployed. By means of optical sensors not shown in further detail, the arrival of the strap end at the strapping head may be detected during the advance of said strap and said advance may thus be stopped. In the event of detection malfunction, the strap impinges the strap stop whereby the advance of the packing strap shall also be stopped.

The sequence of a strapping method in accordance with an embodiment of the invention is elucidated as follows in relation to FIGS. 8 through 14. To implement strapping (looping) and seal, first the pivot plate 43 is pivoted into its welding position underneath the upper electrode members 35b, 36b. In that position the pivot plate 43 is configured immediately above the package 7. Next the control 2 powers the strap drive 10. As a result the packing strap 44 is drawn from the supply receptacle 3 and moved through the strap guide 6. The packing strap under consideration is fitted with a protective layer, in particular a coat of enamel or the like or wax. Various straps of this kind were welded within the scope of the invention, for instance the strap 0204012 (19×0.90) "paint/wax" made by the enterprise Magnus at Dinslaken (Germany), the strap 085207 (19×0.60) of the enterprise Steel at Swansea, the strap Liljendals (19×0.40) "paint/wax" of the enterprise Liljendals Bruk AB and the strap 1114.680 (19×8.0) enamel NF of the enterprise Burserud.

Figure 8:
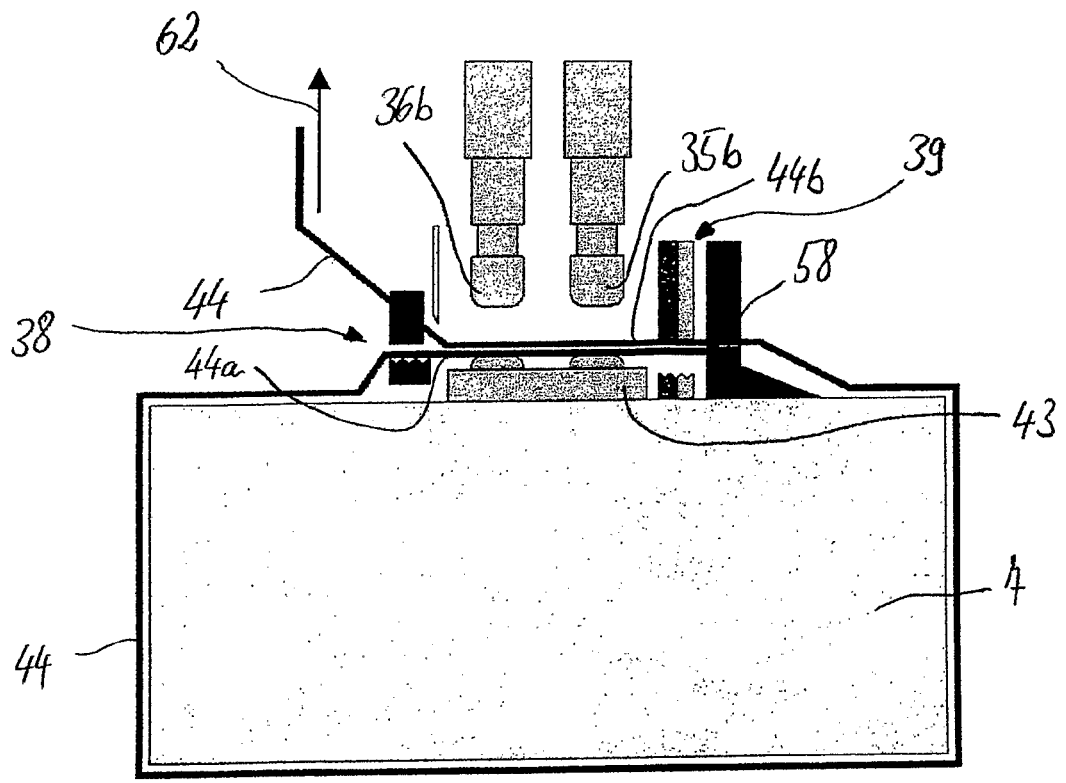

Accordingly, the packing strap rests loosely as a loop around the package 7, the end zone of said strap resting against the strap stop 58 moved into a front stop position, or stopping shortly before it. As a result the packing strap 44 is situated in the region between the strap stop 58 and approximately the cutting blade 40 in the form of two plies 44a, 44b above the pivot plate 43. Thereupon, the first clamp 38 is used to clamp only a single ply segment of said strap in the region of the pivot plate. Next a backward motion of the packing strap 44 can be implemented by means of the strap drive in the direction of the arrow 62. Due to the clamping action of the first clamp 38, the packing strap 44 may rest stretched tautly against the package 7. This state is shown in FIG. 8.

Figure 9:
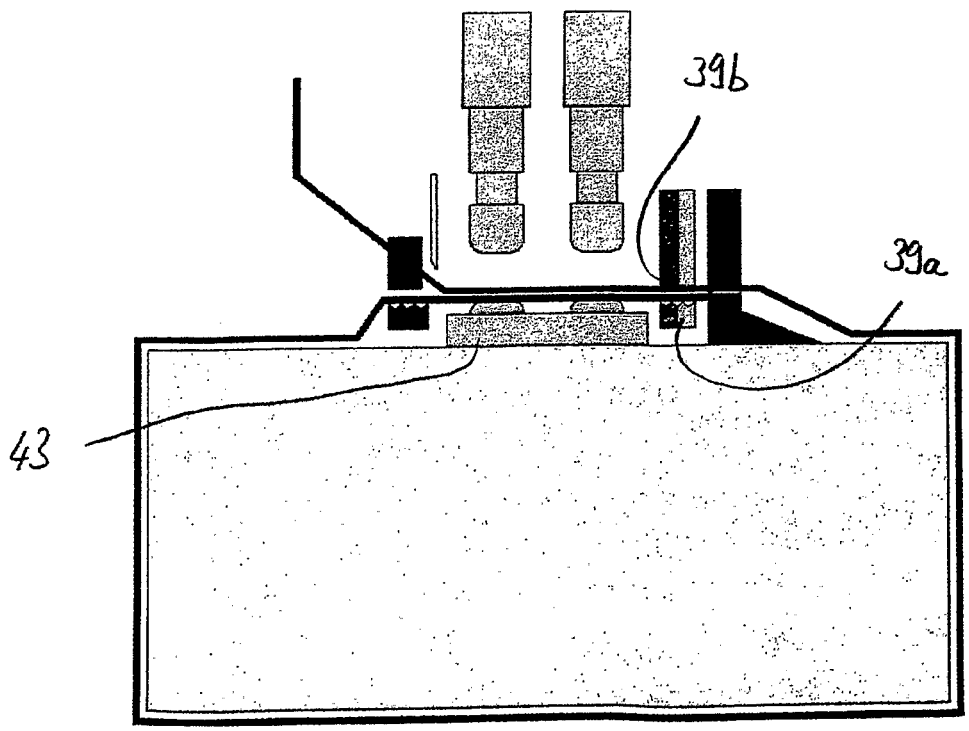

Next, the second clamp 39 is actuated as shown in FIG. 9, whereby the upper clamp element 39b is displaced toward the pivot plate 43 and the packing strap is compressed between the upper and lower clamp elements 39a, 39b. Accordingly, the second clamp 39 clamps a double ply segment of the packing strap 43. The clamping stress is selected so large that the metal notching elements of both of the upper and lower clamp elements 39a, 39b of the second strap clamp 39 pierce the protective layer as far as the inner metal strap of both strap plies 44a, 44b. The clamp elements 39a, 39b are now each in electrical contact with one of the strap plies 44a, 44b.

Figure 10:
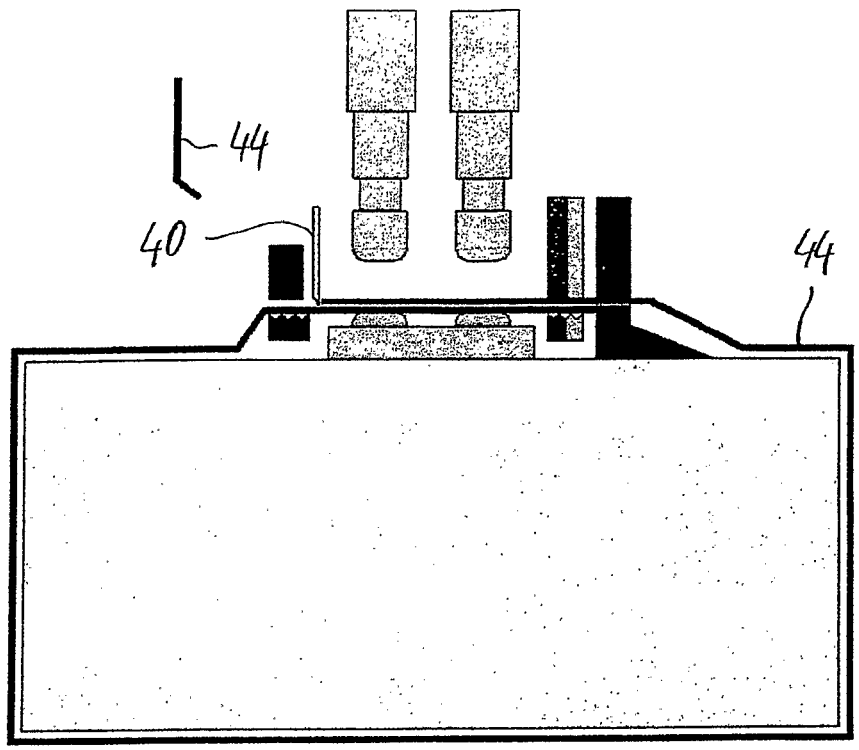
Figure 11:
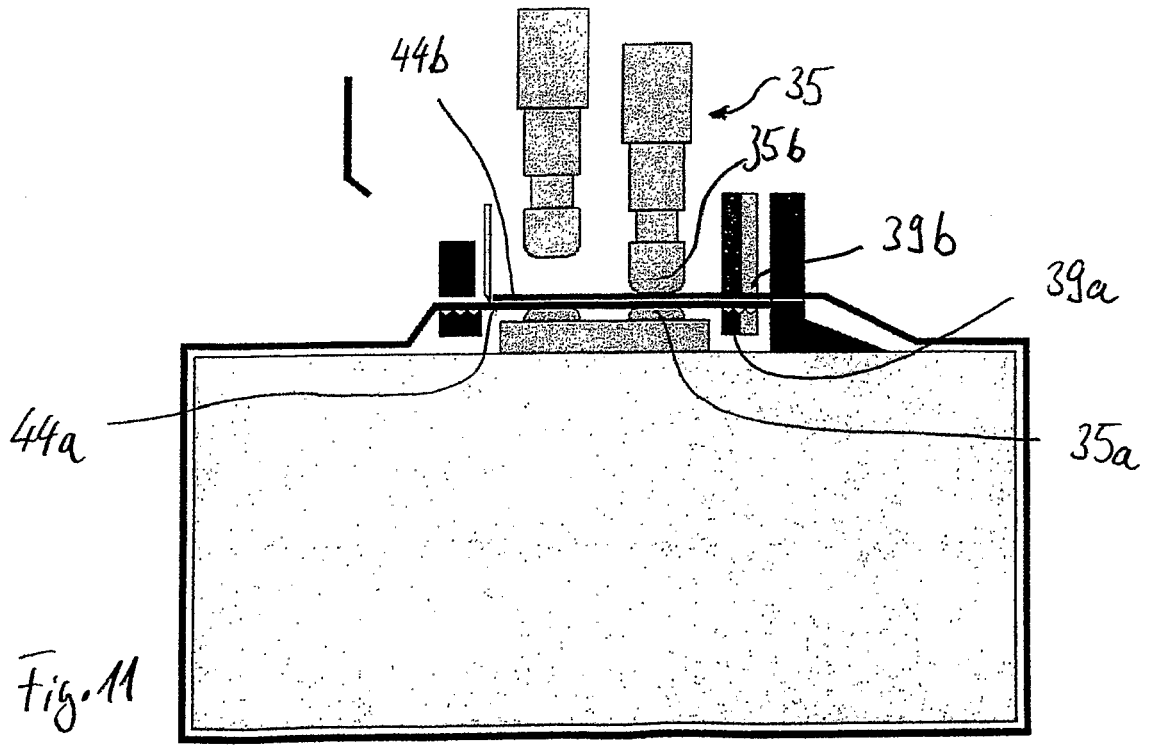

As shown in FIG. 10, the cutting blade 40 is actuated next to sever the upper strap ply 44b between the second electrode 36 and the first clamp 38.

Thereupon, the upper electrode member 35b of the first electrode 35 may be lowered on the double ply packing strap 44, whereby the two strap plies 44a, 44b are compressed against each other. In the region of the first electrode 35, the upper electrode member 35b rests on the upper strap ply 44b and the lower electrode member 35a supports the lower strap ply 44a.

In this state of the strapping head, a preheating current is applied by the welding power source 15 to the first electrode 35. However, the superposed protective layers preclude a direct current path from one strap ply 44b to the other strap ply 44a. Because the upper and lower clamp elements 39a, 39b of the second clamp 39 pierced the protective layer 44c and preferably now make contact by their notching elements 41, 42 with the metal strap 44d, the preheating current passes through the upper electrode member 35b through the upper strap ply 44b to the upper clamp element 39b. By means of the support plates 48, 49, of the levers 51, 52 and the pivot plate 43, said current then reaches the lower clamp element 39a of the second clamp 39. At that point the current passes into the lower strap ply 44a and then through the electrode member 35a of the first electrode closes the current loop 64 termed herein as the shunt path or bypass circuit or current detour.

The above preheating current is, for instance 2,500 amp, and is applied during a predetermined time interval wherein the enamel or protective layer 44c of the packing strap 44 will be heated. It was observed that such heating suffices to lower to such an extent the electric resistance between the two strap plies 44a, 44b that, following said heating the current will pass directly between the two electrode members 35a, 35b through the two strap plies without taking the detour present at the higher electric resistance through the clamp elements 39a, 39b. Accordingly, the control now can switch to a welding current which is substantially higher than that of the preheating procedure, namely being, for instance, between 6,000 and 7,000 amp. The time interval during which the preheating current is applied, and hence the time required until the electrical resistance of the strap plies has dropped so much that the current shall pass straight from one into the other strap ply, essentially depends both on the amplitude of the preheating current and on the nature of the protective layer. Optimal conditions may be ascertained for any packing strap by running a few tests wherein said parameters will be varied.

At the time or shortly thereafter of said switchover, the detour is substantially eliminated and the welding current between the two electrode members 35a, 35b will melt the strap material within an approximately circular spot. In a manner already known, the material of the two strap plies 44a, 44b will combine and shall solidify after the welding current has been shut off. In this manner a first weld connection has been made.

Figure 12:
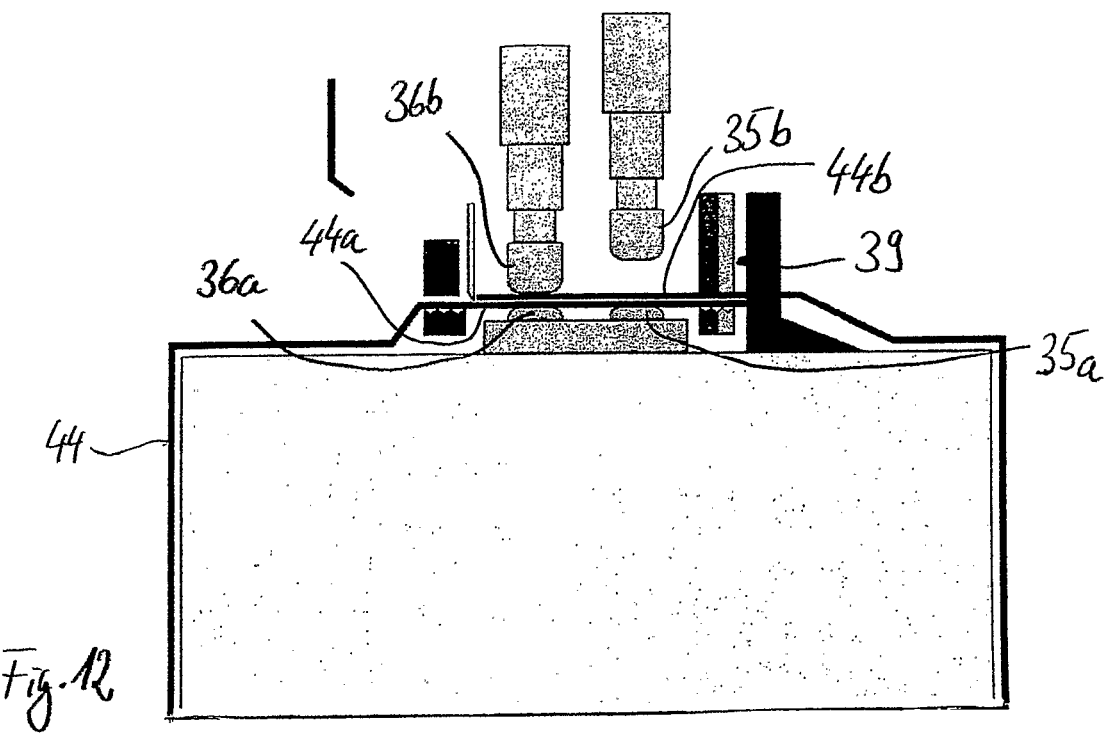

Immediately after the upper electrode member 35b of the first electrode has been raised off the packing strap 44 by its control lever, then, as shown in FIG. 12, the upper electrode member 36b of the second electrode 36 will be lowered onto the strap 44 to generate a second weld connection/seal. Exactly as for the case before that of the first electrode 35, the two strap plies 44a, 44b are compressed by the electrode members 36a, 36b. Optionally, in this case too a preheating current may be first applied to the second electrode 36 of an amplitude sufficient to generate another detour path. As regards the detour path preceding the second weld connection, the said detour current may pass by means of the upper electrode member 36a through the first weld connection into the lower strap ply 44a and from there through the lower electrode member 36a. Another current path also is conceivable, for instance again through one of the strap clamps.

Figure 13:
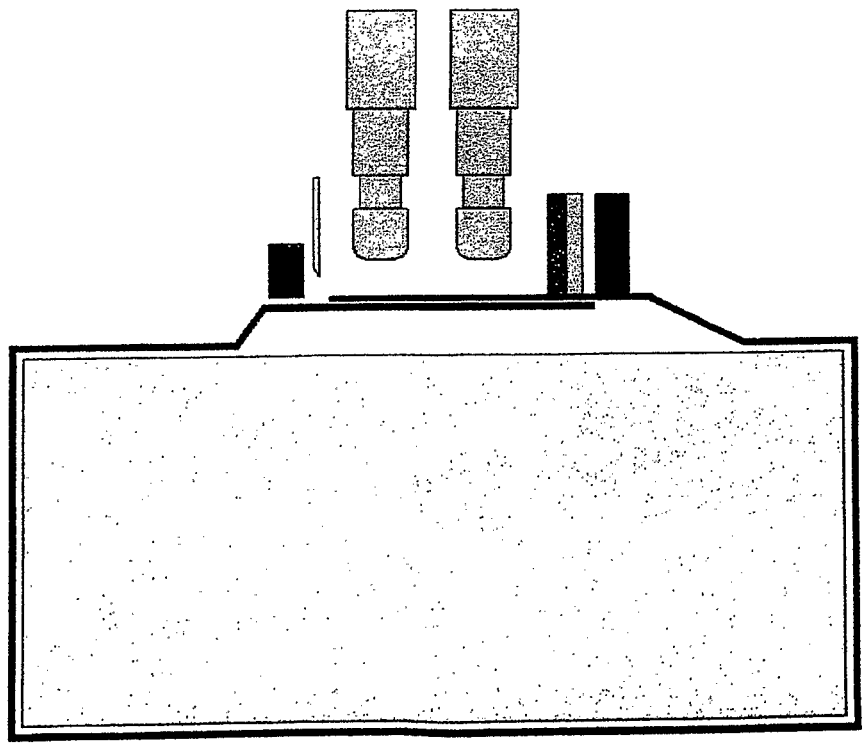
Figure 14:
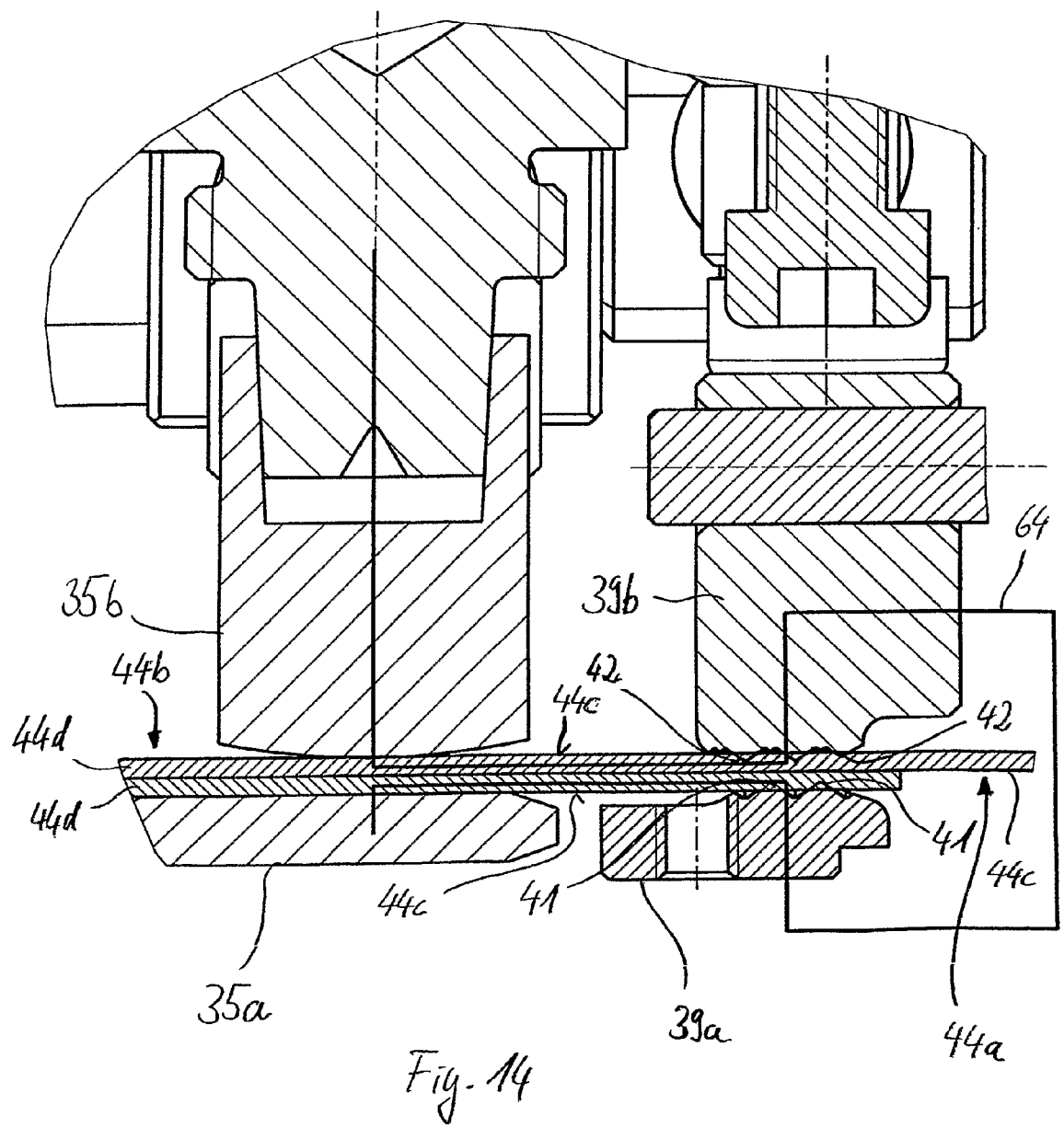
FIG. 14 shows a partial section of a first electrode and a second clamp of the strapping head, further, by means of a solid line, a detour current.

Preferably however, a welding current higher than the preheating current shall be applied to the case of the second electrode 36. Because of the prior heating and the ensuing reduction in electrical resistance in particular between the two strap plies 44a, 44b, the welding current is able to pass directly through the two strap plies between the two electrode members 36a, 36b. By means of a melting process, material commingling between two plies and cooling of said material of both plies after the welding current has been shut off and by raising the upper electrode member off the packing strap, a second welding connection/seal has been created. Finally, the seal is released from applied loads by pivoting away the pivot plate 43 (FIG. 13). Strapping (looping) is now completed.

In further, omitted embodiment modes, more or fewer than two spot weld connections per seal also may be generated. Moreover the said seals may assume shapes different from circular spot weld connections.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims

The invention claimed is:

1. A strapping device to strap/loop materials to be packaged by means of packing strap (44) fitted with a protective layer (44c), said strapping device comprising:
    a sealing system to connect and seal to each other two superposed strap plies (44a, 44b) of a loop of the packing strap, wherein the sealing system is a resistance welder fitted with at least two electrode members (35a, 35b; 36a, 36b) connected to a power source and at least one piercing portion for piercing the packing strap protective layer (44c) at one of the strap plies (44a, 44b), the at least one piercing portion is a clamp element located adjacent to one of the at least two electrode members, wherein a preheating current of the resistance welder is applied to the packing strap fitted with the protective layer to lower an electrical resistance between the two superposed strap plies, wherein a welding current of the resistance welder which is substantially higher than the preheating current, is thereafter applied to the two superposed strap plies to connect/seal the two superposed strap plies, and wherein the clamp element provides an electrical path for the preheating element that is different from an electrical path followed by the welding current.

2. The strapping device as claimed in claim 1, wherein the two electrode members are configured such that the tips thereof are electrically connected to each other even when the two strap plies are electrically insulated from each other.

3. The strapping device as claimed in claim 1 wherein at least one electrode member of the at least two electrode members allows setting up electrical contact with the metal packing strap (44*d*).

4. The strapping device as claimed in claim 1 further includes a second clamp element.

5. The strapping device as claimed in claim 1 wherein at least one of the electrode members (35*a*, 35*b*; 36*a*, 36*b*) is fitted with a cooling system.

6. The strapping device as claimed in claim 1 including a strapping head to generate a strap loop around the package using a metal packing strap and to further seal to each other two superposed packing strap plies, wherein at least components of an electric power supply of the resistance welder are configured at the strapping head (5), at about the electrode members (35*a*, 35*b*; 36*a*, 36*b*).

7. The strapping device as claimed in claim 6, wherein at least one thyristor system, one connection unit for the thyristor system to supply electric power and one electric transformer are situated at the strapping head.

* * * * *